(No Model.)
4 Sheets—Sheet 1.

L. WILSEY.
COMBINED FRUIT GRADING, PERFORATING, AND DRYING MACHINE.

No. 540,773.
Patented June 11, 1895.

(No Model.) 4 Sheets—Sheet 2.

L. WILSEY.
COMBINED FRUIT GRADING, PERFORATING, AND DRYING MACHINE.

No. 540,773. Patented June 11, 1895.

Witnesses:
Theo. L. Gatchel.
Louis G. Randall.

Lewis Wilsey.
by John Wedderburn
his Attorney.

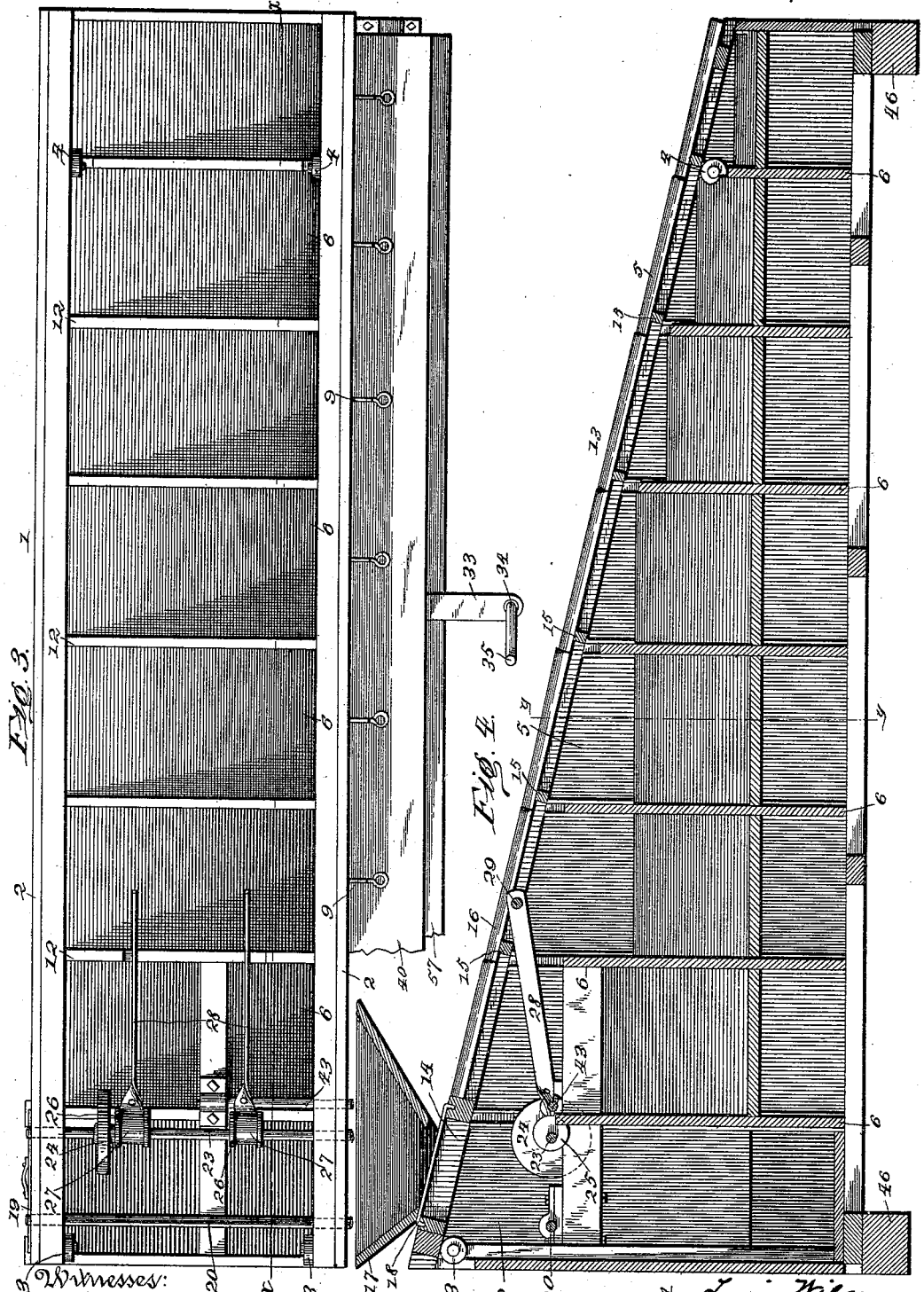

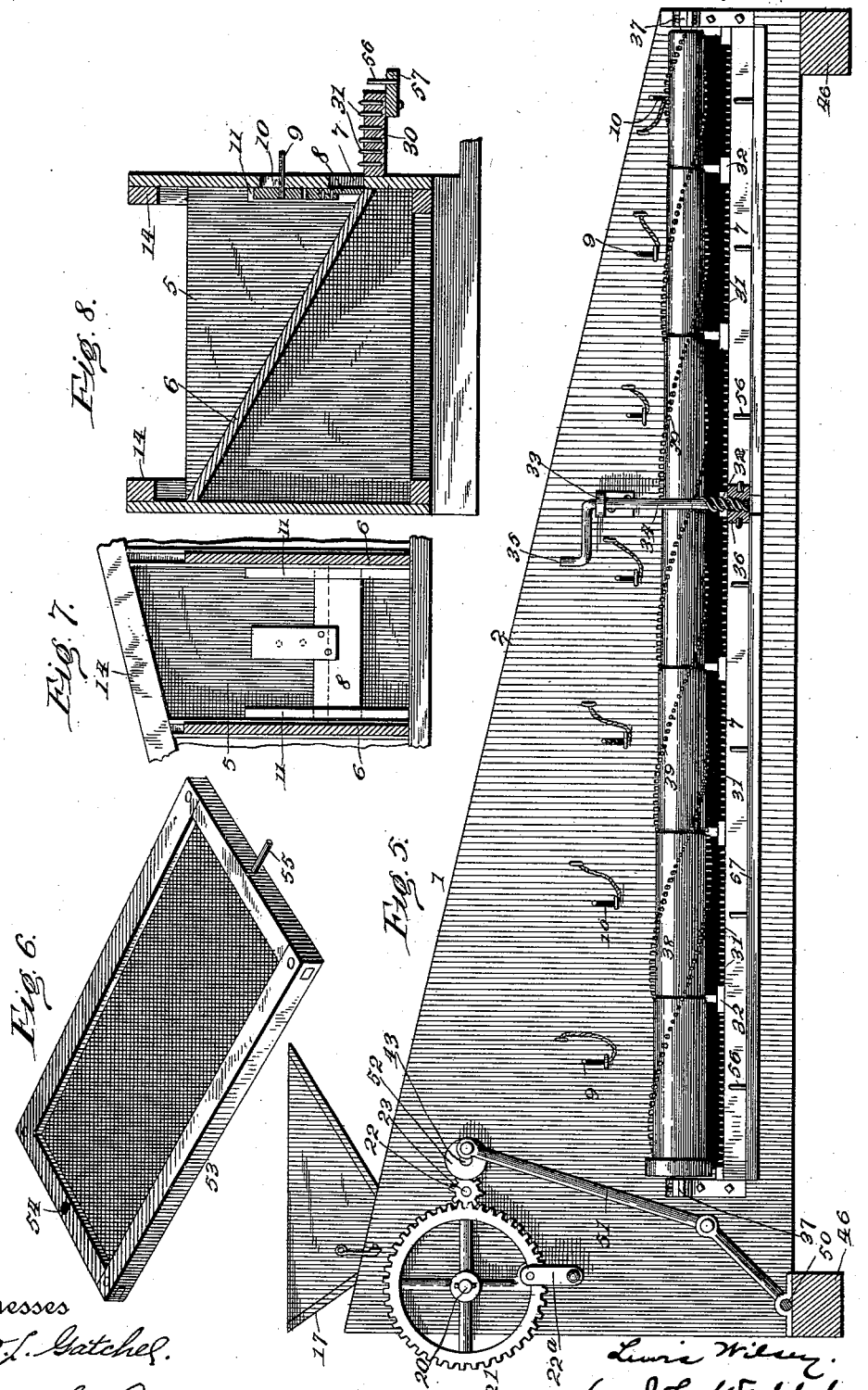

UNITED STATES PATENT OFFICE.

LEWIS WILSEY, OF ARROYO GRANDE, CALIFORNIA, ASSIGNOR OF ONE-HALF TO RUSSEL ROBISON, OF SAME PLACE.

COMBINED FRUIT GRADING, PERFORATING, AND DRYING MACHINE.

SPECIFICATION forming part of Letters Patent No. 540,773, dated June 11, 1895.

Application filed February 1, 1895. Serial No. 536,928. (No model.)

*To all whom it may concern:*

Be it known that I, LEWIS WILSEY, a citizen of the United States, and a resident of Arroyo Grande, in the county of San Luis Obispo and State of California, have invented certain new and useful Improvements in a Combined Fruit Grading, Perforating, and Drying Machine; and I do hereby declare the following to be a full, clear, and exact description of the invention, such as will enable others skilled in the art to which it appertains to make and use the same.

My invention relates to improvements in combined fruit cleaners, graders, perforators and driers, the same having for its object to provide an apparatus so constructed that by the application of power applied thereto for operating the mechanism, fruit may be automatically cleaned, assorted into sizes, perforated and discharged upon drying trays which are adapted to be removed and replaced by other trays upon which the fruit is properly dried.

The invention consists of a casing divided off into apartments adapted to receive the fruit of different sizes having an inclined grader consisting of a frame adapted to be reciprocated back and forth, with openings therein of gradually increasing size, for discharging fruit of certain sizes therefrom. These compartments are provided with adjustable doors leading to the perforator, which consists of a hinged bar having teeth or projections on its upper face, and a toothed cylinder adapted to engage therewith. Leading from the perforating device is a drying frame having a series of reticulated drying trays which are removable therefrom. The said drying trays are pivoted at one end and at the other end have a projecting pin passing between similar pins on the upper side of a reciprocating bar forming a part of the drying frame.

The invention consists of other details of construction, combinations of parts, and arrangements of instrumentalities which will be more fully hereinafter described and claimed.

The invention is clearly illustrated in the accompanying drawings, forming a part of this specification, in which—

Figure 1:
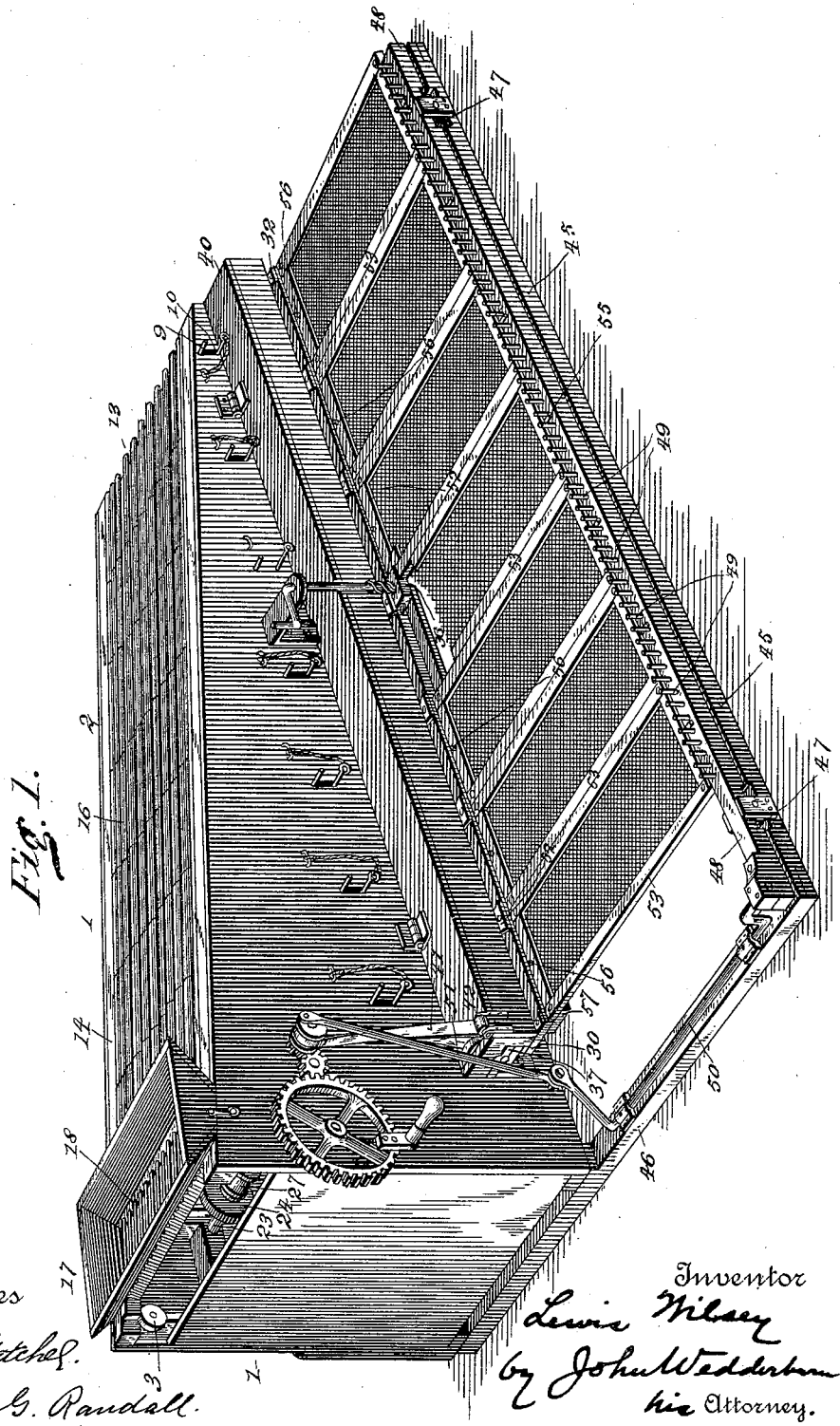
Figure 2:
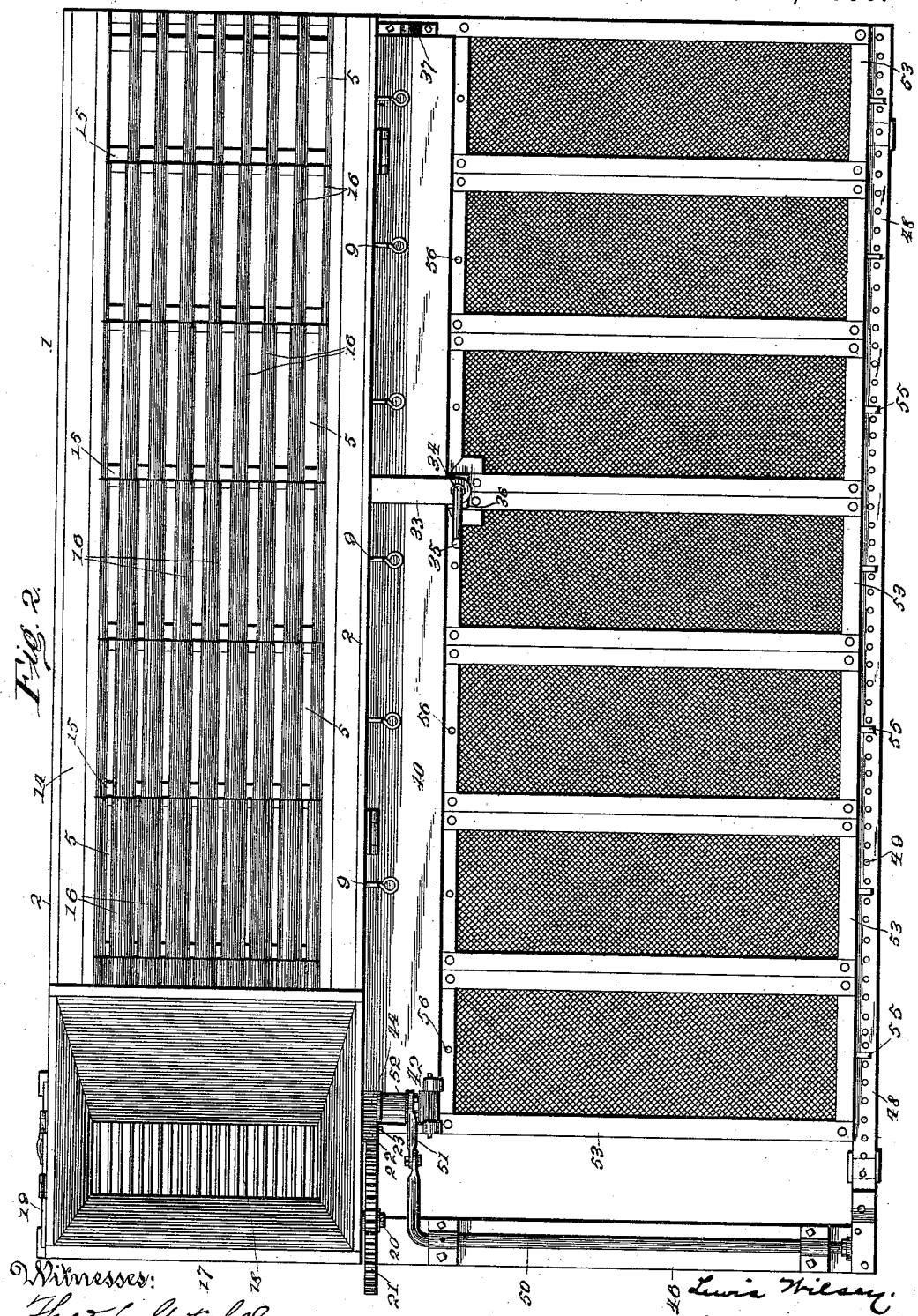

Figure 1 represents a perspective view of my invention, looking from the side of the same upon which the drying frame is located. Fig. 2 is a plan view of the same. Fig. 3 is a plan view of the same with the feed-hopper and the grading and drying frames removed. Fig. 4 is a vertical section through the said frame, taken on the line $xx$ of Fig. 3. Fig. 5 is a side elevation of the grading-casing with the drying-frames and the casing in which the perforating mechanism is inclosed removed. Fig. 6 is a detail view of one of the reticulated drying-trays. Fig. 7 is a detail view of one of the adjustable parts of the compartments for the reception of the graded fruit. Fig. 8 is a vertical transverse section on the line $y\,y$ of Fig. 4.

Like reference-numerals indicate like parts in the various views.

1 represents the casing of the grader, which is substantially in the form shown, with inclined side walls 2 having rollers 3, 3, and 4, 4, therein, upon which the grader frame is adapted to be reciprocated.

The casing 1, as shown, is provided with eight compartments 5, having inclined bottoms 6 and exit openings 7 therein, which are adapted to be closed by means of the doors 8. These doors are T-shaped and have an outwardly projecting pin 9 which extends through elongated slots 10 in the side of the casing 1. They move between guides 11, 11 on the inside of the compartments and are adapted to be moved up and down in order to open or close the outlet from the compartments 5. The compartments 5 are separated from one another by vertical partitions 12, as clearly shown. The grader frame is made up of two side pieces 14, 14, and has therein a series of cross bars 15 which occupy a position when the said frame is in operation, directly over the partitions 12 separating the compartments 5. Extending longitudinally of the grader frame 13 are a series of parallel bars 16, the said bars being of varying thickness to provide spaces between the same of varying thickness for the purpose of separating or grading the fruit into different sizes. The spaces between the said bars over the first receptacle 5 are very narrow. Those between the second are somewhat wider, the same gradually increasing in size toward the bottom of the frame.

17 is a hopper pivoted to the upper part of one side of the casing 1, in which the fruit to be treated is fed. This is located over the part of the grading frame in which the openings are made by a series of wires 18 strung thereover, and between which the dirt, leaves, &c., from the fruit, are adapted to be passed. Beneath these openings is a receptacle for trash having a door 19 therein from which the same may be removed. Located in the upper forward part of the casing 1 is a horizontally disposed shaft 20 having upon its outer end a spur wheel 21 with a crank thereon to which power is applied from any suitable source. Meshing with the spur wheel 21 is a pinion 22 located upon the outer end of a shaft 23 parallel to the shaft 20 and journaled in suitable bearings in the casing 1. This shaft 23 has thereon a balance wheel 24 and a pair of eccentric collars 25, 25 fixed thereto. Said collars 25 have annular flanges 26 at their outer ends and upon each collar, between each pair of flanges are passed loops 27, 27, of pitmen 28, 28, connected at their other end to a cross bar 29 on the grader frame 13.

By the mechanism just described a reciprocating motion is given to the grader frame 13 upon the application of power to the crank 22$^a$ on the shaft 20.

On the side of the casing 1 just beneath the exit openings from the fruit apartments 5 is hinged a bar 30 extending longitudinally across the sides of said casing. This bar 30 has upwardly projecting teeth 31 thereon and at a point just opposite each one of the partitions 12 of the fruit apartments 5 is provided with angular guide pieces 32 for keeping the contents of each compartment 5 separate, as the fruit is fed therefrom up onto the drying trays.

33 is a bracket secured to the sides of the casing 1 in which is supported an adjusting screw 34 having a crank arm 35 thereon. The said screw is threaded at its lower end and passes through a threaded lug 36 projecting from the sides of the bar 30. By means of this screw the said bar 30 may be adjusted up and down upon its hinge for a purpose that will appear later.

Journaled in boxes 37 on the side of the casing 1 and located above the hinged bar 30 is a cone-shaped shaft 38 provided with spirally arranged teeth or projections 39 thereon. As stated, this shaft is cone-shaped. It may, however, be made of a series of cylindrical parts of varying diameter, corresponding with the compartments 5, from which the fruit is fed to the perforating mechanism—that is to say, at the point opposite the first compartment 5 the cylinder is of large diameter, and at the point opposite the second compartment 5 it is of somewhat smaller diameter, gradually decreasing in size down to its other end, the difference in diameters being to correspond with the size of the fruit received from the different compartments 5. The shaft 38 is inclosed by a hinged covering 40 slotted at one end on its upper face for the passage therethrough of the belt 41 by which power is transmitted to the shaft 38. The cover has at a point opposite the belt a belt tightener 42, as clearly shown. The belt 41 passes around the end of the shaft 38 and around the projecting end of a shaft 43 journaled in the casing 1 and having a pinion 44 thereon meshing with the pinion 22 before referred to. By this construction power from the main shaft 20 is transmitted through the gearing described to the cylinder 38, causing the same to rotate in its bearings.

Upon the side of the casing 1 is secured the drying frame of the device, which is made up of longitudinal beams 45 and cross beams 46. Upon the longitudinal beam 45 are mounted rollers 47, 47, upon which rests the reciprocating bar 48, the same being provided with a series of upwardly projecting pins 49 for the purpose which will appear later. Said bar 48 is connected at one end with the end of a rock shaft 50, which moves in suitable boxes on the cross beam 46 of said frame. The other arm of said rock shaft is connected by means of a pitman 51 with an eccentric 52 on the end of the shaft 43. By this construction power is transmitted from the shaft 20 through the gearing before described, pitman 51 and rock shaft 50 to reciprocate the bar 48.

53, 53 represent a series of reticulated drying trays, which have a vertical slot in one end and a projecting pin 55 at the other end. The said trays are adapted to be placed in order at points opposite the several fruit apartments 5, the slot 54 therein engaging with pins 56 on a ledge 57 on the hinged bar 30. By this means a pivotal connection is given between the trays and the said bar. The pin 55 rests upon the upper side of the bar 48 between the projecting pins 49 thereon, so that by the reciprocation of the bar 48 through the mechanism described, the trays will be given a shaking motion for the purpose of spreading the perforated fruit thereover. A series of these pins 49 are provided upon the upper side of the reciprocating bar 48, in order to provide for any number of trays 53 of any width that it may be desired to use.

My invention has been sufficiently described, it is thought, to enable its operation to be fully understood. Starting then with the apparatus in the position in which it is shown in Fig. 1, the operation is as follows: The fruit is fed through the hopper 17 onto the grader frame 13 and power is applied to the crank 22$^a$ on the shaft 20, thereby causing a reciprocation of the grader frame 13, the rotation of the shaft 38 and the reciprocation of the drying trays 53, by the mechanism which has been described. The fruit passes first onto the separating part of the grader 13, and the dirt, leaves and other foreign matters pass between the wires strung thereon into the waste or trash apartment, from which it may be removed through the door 19 therein. The reciprocation of the grader frame 13 and the inclined position of said frame cause the fruit to slide down thereon and by reason of the graduated sizes of the openings in said grader frame the fruit is discharged therefrom into the apartments 5 in assorted sizes—that is to say, fruits of similar size are discharged into the first apartment 5, those of a larger size in the second apartment, and those of a still larger size in the following apartment, down to the lower end of said frame. That which is so large that it will not pass through any of the openings in the grader frame is discharged from the lower end thereof into a box or other receptacle adapted to receive it. The doors 8 of the apartments 5 are opened from the outside by means of the projecting arms connected thereto passing through the slots in the side of the casing 1. The fruit in its assorted sizes is then fed from the apartments between the bar 30 and the shaft 38. The rotation of the shaft 38 by the mechanism described causes the thorough perforation of the fruit passing between the said bar and shaft and feeds it therefrom onto the several drying frames 53. The shaking motion given to the said drying frames causes the spreading of the fruit thereover and when the same are filled the doors 8 of the apartments 5 are closed and the drying trays removed and others inserted in their place. When the new trays have been inserted the doors 8 are again opened and the operation continued as before. For fruits of various kinds it is necessary to regulate the depth to which the same are perforated. This is done by raising or lowering the hinged bar 30 by means of the adjusting screw 34.

It will be seen that by my apparatus I am enabled automatically to clean, grade, perforate and dry fruit by merely applying the power to operate the machine and feeding the fruit thereto.

The invention has been described in its preferred form, but it is obvious that many minor changes can be made therein without departing from the nature or spirit of the invention, or sacrificing any of its advantages. Various modifications might be made therein, and all such modifications and obvious changes are intended to be embraced by this patent.

Having now described my invention, what I claim as new, and desire to secure by Letters Patent, is—

1. In a device of the character set forth, the combination of mechanism for grading or assorting fruit, mechanism for perforating the same, and drying frames pivotally connected to said perforating mechanism and mechanism whereby said frames receive a shaking motion for the purpose of spreading the fruit thereover, substantially as and for the purpose described.

2. In a device of the character set forth, the combination with a casing provided with compartments adapted to receive fruit in assorted sizes, of a perforating mechanism for said fruit, consisting of a hinged bar on the outside of said casing and a shaft adapted to rotate thereover, the said shaft and bar being provided with teeth or projections for the purpose described.

3. In a device of the character set forth, the combination with a casing having a series of compartments adapted to receive fruit in assorted sizes, the said compartments having openings therein provided with doors adapted to be operated from the outside, of perforating mechanism consisting of a hinged bar located on the outside of said casing beneath said openings, and a cone-shaped shaft adapted to be rotated in connection therewith, said hinged bar and the said cone shaft being provided with teeth or projections, substantially as and for the purpose described.

4. In a device of the character described, the combination with a casing having a series of compartments adapted to receive fruit in assorted sizes, the said compartments having openings therein provided with doors adapted to be operated from the outside, of perforating mechanism consisting of a hinged bar located on the outside of said casing beneath said openings, and a cone shaft adapted to be rotated in connection therewith, means for raising and lowering said bar consisting of a bracket located on the outside of said casing in which is mounted a screw engaging a lug on said bar, the said hinged bar and cone shaft being provided with teeth or projections, substantially as and for the purpose described.

5. In a device of the character set forth, the combination with a casing having grading and perforating mechanisms connected therewith, of a drying frame located on the side of said casing, a reciprocating bar thereon provided with teeth on the upper face thereof and a series of reticulated removable drying trays pivotally connected at one end to the perforating mechanism and adapted to receive a shaking motion for the purpose of spreading the perforated fruit thereover by means of the reciprocating bar of said drying frame, substantially as described.

6. In combination with a fruit perforating mechanism, consisting of a hinged bar provided with teeth or projections, and a shaft also provided with teeth or projections, and operating in connection with said bar, of a reticulated drying frame slotted at one end for the reception of a pin on said hinged bar, and provided at the other end with an outwardly projecting pin engaging pins on the reciprocating bar whereby a shaking motion is given to said trays for the purpose of spreading the fruit evenly thereover, substantially as described.

7. In a device of the character set forth, the combination with a casing having inclined sides, a grading frame adapted to be reciprocated in said casing through pitmen connected with eccentric collars on horizontally disposed shafts passing through said casing, the said grading frame being provided with a series of graduated openings located at points directly above a series of fruit apartments in said casing, said apartments having exit openings therefrom, perforating mechanism on the outside of said casing consisting of a hinged bar provided with projections or teeth, a cone-shaped shaft likewise provided with projections or teeth and operating in connection with said hinged bar, means for rotating said shaft consisting of a belt or pulley connected with a horizontal shaft located in said casing and meshing with suitable gearing connected with the main shaft of the machine, and drying mechanism attached to said casing consisting of a reciprocating bar receiving its motion from the main drive shaft of the machine through a rock shaft, a pitman and suitable gearing connected with the main drive shaft, and a series of drying trays pivotally connected to said hinged bar to receive a shaking motion from said reciprocating bar, substantially as and for the purpose described.

In testimony whereof I have signed this specification in the presence of two subscribing witnesses.

LEWIS WILSEY.

Witnesses:
R. ROBISON,
THOMAS ROBISON.